United States Patent [19]

Lindberg

[11] 4,062,943

[45] Dec. 13, 1977

[54] ANTIBIOTIC PRODUCTED FROM THE MICROORGANISM (PSEUDOMONAS LINDBERGII), ITS PREPARATION AND METHOD OF USE

[75] Inventor: George D. Lindberg, Baton Rouge, La.

[73] Assignee: Board of Supervisors Louisiana State University A & M, Baton Rouge, La.

[21] Appl. No.: 764,576

[22] Filed: Feb. 1, 1977

Related U.S. Application Data

[63] Continuation-in-part of Ser. No. 525,520, Nov. 20, 1974, abandoned, and Ser. No. 681,703, April 29, 1976, abandoned.

[51] Int. Cl.$^2$ ............................................. A61K 35/74
[52] U.S. Cl. .................................. 424/115; 195/80 R
[58] Field of Search ...................... 424/115; 145/80 R

[56] References Cited

PUBLICATIONS

Miller, The Pfizer Handbook of Microbite Metabolite, McGraw-Hill Book Co., Inc., N.Y., N.Y., 1961, pp. 26–28.

*Primary Examiner*—Jerome D. Goldberg
*Attorney, Agent, or Firm*—Llewellyn A. Proctor

[57] ABSTRACT

An antibiotic elaborated by the organism *Pseudomonas lindbergii* (ATCC-31099) which is antifungal in nature, or effective in strongly inhibiting or killing various types of fungi. The disclosure also relates to a method for the preparation of such antibiotic.

9 Claims, No Drawings

ANTIBIOTIC PRODUCTED FROM THE MICROORGANISM (PSEUDOMONAS LINDBERGII), ITS PREPARATION AND METHOD OF USE

RELATED APPLICATIONS

This is a continuation-in-part of application Ser. No. 525,520, filed Nov. 20, 1974, now abandoned, and application Ser. No. 681,703, filed Apr. 29, 1976 now abandoned.

FIELD OF THE INVENTION

This invention relates to a novel antibiotic, or antibiotics, particularly effective for use against fungi, and to methods for the production of this antibiotic, or antibiotics. The antibiotic, or antibiotics, is produced by the microorganism Pseudomonas lindbergii (ATCC-31099).

Antibiotics, chemical compounds elaborated by various microorganisms, are used in medicine to combat other injurious microorganisms. Antibiotics which inhibit the growth of other microorganisms to some degree are relatively common. Those which are antagonistic, or strongly inhibitory, to fungi are not at all common. The latter types of antibiotics are those commonly used to treat fungi of species which have been known to cause destruction, or disease and even death in animals. Athlete's foot and ringworm, candidiasis and aspergillosis, histoplasmosis and coccidioidomycosis in humans, all caused by fungi, have been treated with some success. Fungicides are known which can kill fungi on contact. Antibiotics which are lethal to fungi, however, are extremely rare. The advantages offered by an antibiotic which can not only suppress or inhibit the growth of fungi, but actually produce mycelial death of fungi in the treatment of fungal diseases are profound.

It is accordingly a primary object of the present invention to provide a novel antibiotic which is strongly inhibitory, and even lethal to many fungi.

A specific object is to produce a novel antibiotic useful in the treatment of mycoses in plants and animals, and particularly in man.

A further object is to provide a novel process for the preparation of such an antibiotic. These and other objects are achieved in accordance with this invention which comprises a novel antibiotic produced by the microorganism Pseudomonas lindbergii (ATCC-31099), a microorganism collected at Baton Rouge, Louisiana, from the leaves of Bermuda grass (Cynodon dactylon) infected with Helminthosporium and other secondary fungi.

The Pseudomonas lindbergii is a rod-shaped bacterium having several polar flagella, approximately six in number. It does not floresce under ultra-violet light, and is further characterized by such physiological properties as follows:

| | Reaction |
|---|---|
| Catalase decomposition of $H_2O_2$ | positive |
| Nitrate reduction | positive |
| Cytochrome oxidase activity | positive |
| $\beta$-galactosidase | negative |
| Argenine dehydrolese | negative |
| Lysine decarboxylase | negative |
| Orthimine decarboxylase | negative |
| Citrate utilization | negative |
| $H_2S$ production | negative |
| Urease production | negative |
| Phenylalanine deaminase | negative |
| Indole production | negative |

-continued

| | Reaction |
|---|---|
| VP (acetoin) | negative |
| Malonate utilization | negative |
| Gelatin hydrolysis | negative |
| Esculin hydrolysis | positive |

Anaerobic acid production with following carbon sources was negative, to wit
Glucose
Mannitol
Inositol
Sorbitol
Rhamnose
Sucrose
Melibiose
Amyglolin
Urabinose A patent culture of Pseudomonas lindbergii is on deposit with the American Type Culture Collection and is identified as ATCC-31099. The culture shall be maintained during pendence of this application. All restrictions on the availability of the culture deposit to the public will be irrevocably removed on the granting of a patent, and the culture will be maintained throughout the life of the patent.

The antifungal antibiotic or antibiotic substance of this invention, is elaborated by Pseudomonas lindbergii when the latter is grown in a nutrient medium containing assimilable carbon, nitrogen, and other nutrients, under surface conditions or under submerged aerobic conditions at regulated temperatures within a range of ambient temperatures, or temperatures ranging from about 15° C to about 40° C, preferably from about 25° C to about 35° C. Aerobic conditions can be achieved by bubbling sterilized air through the nutrient, or broth medium and by vigorous stirring more or less continuously during the period required to form and multiply the antibiotic. Satisfactory concentration of the antibiotic is generally achieved after about four to five days of growth, higher concentrations of the antibiotic being found after about 10 days, or more, of growth. Elaboration of the antibiotic is enhanced, by growing the Pseudomonas lindbergii in an aqueous media, e.g., in potato, dextrose broth at a temperature of about 25° C for a period of from about five to about ten days. In the preparation of the antibiotic, optimum yields are produced from cultures of about 10 days of age, or slightly older. Isolation of the pure antibiotic from the fermented broth involves several steps which can include filtration, centrifugation, extraction, precipitation, adsorption and elution, ion-exchange chromatography, and crystallization.

The nutrient, or culture medium, in which the Pseudomonas lindbergii is grown contains the antibiotic, which antibiotic can be used, preferably after clarification and concentration within the medium, or isolation from the medium for use. Typically, the culture medium after elaboration of the antibiotic by the Pseudomonas lindbergii is filtered or centrifuged in an initial clarification step to remove a major portion of the bacterial sediment. Further clarification can be effected by washing the residual aqueous liquid with solvents, e.g., ethyl ether, which leave the antibiotic within the aqueous phase. After clarification, the antibiotic can be concentrated in vacuo within the aqueous phase, or by evaporation, usually at reduced pressure to avoid excessive temperature. The concentrated antibiotic is highly active and can be separated from the aqueous liquid by several extractions with chloroform, or other solvent. Nonpolar solvents are preferred.

In a typical method for the production of the antibiotic, a stationary culture medium containing *Pseudomonas lindbergii* which had been incubated for about 10 days at about 25° C was centrifuged at 5000 r.p.m. to remove a major proportion of the bacterial sediment. One liter portions of the filtered culture medium were each then washed with 500 milliliter portions of ethyl ether, and the ethyl ether subsequently discarded. Each of the washed portions were then concentrated in vacuo to one-tenth of their original volume. The portions of concentration were each then extracted four times with equal volumes of chloroform. The separated portions of chloroform in each instance were then evaporated to leave behind a precipitate containing the antibiotic.

EXAMPLES 1-10

To test the effectiveness of the antibiotic in inhibiting, or killing, various types of fungi, portions of a culture medium containing *Pseudomonas lindbergii* aged for 10 days at 25° C were streaked as thin lines upon potato, dextrose agar surfaces, contained within petri dishes, opposite 3 to 4 day old colonies of various types of fungi covering areas about one inch cross-sectional diameter. In such tests a linear distance of about one inch separated the streaks from the colonies of fungi. In other petri dishes colonies of fungi were spotted upon potato, dextrose agar surfaces without any introduction therein, or innoculation thereof with cultures of *Pseudomonas lindbergii*. The results of these tests were as follows:

In the petri dishes which had not been innoculated, the fungus colony gradually spread across the surface of the agar. The color of the fungi was characteristic of the fungus being tested.

In the petri dishes which had been inoculated and streaked with the cultures of *Pseudomonas lindbergii*, the fungi grew in a direction away from the streak of *Pseudomonas lindbergii*. The colonies of fungi on the sides facing the streaks of the culture medium containing *Pseudomonas lindbergii* ceased to grow within forty eight hours, within which period of time the color of the colonies of fungi at the edges facing the streaks of *Pseudomonas lindbergii* began to change to a color indicative of approaching death. For example, certain of the colonies of fungi at the edges facing the streaks of *Pseudomonas lindbergii* began to change to a yellowish-tan color. Subsequent to this period of time, the yellowish-tan color deepened, and gradually spread throughout the colonies until all growth of the fungi ceased. In most instances the colonies of fungi were strongly inhibited, or killed within two weeks, this having occurred as the antibiotic, or antibiotics, diffused through the agar, and through the separating space between a streak of *Pseudomonas lindbergii* and the colonies of fungi for contact and permeation of the colonies of fungi. Mycelial death progressed, in most cases, to involve an entire fungus colony.

In the tests the antibiotic, or antibiotics, proved lethal to all *Heiminthosporia* tested. It also proved lethal to fungi representative of all major classes of fungi, i.e., *Phycomycetes, Ascomycetes, Basidromycetes* and *Fungi imperfectii*. It thus proved lethal to *Pythium, Rhizoctonia, Stemphyllium*, some *Fusaria, Achyla*, and several unidentified fungi. Grieseofulvin, an effective, widely investigated, available antifungal antibiotic extensively used by the U.S. Army for treatment of human mycores in wet, tropical areas is not particularly effective in preventing infections caused by such fungi.

In sharp contrast in actual tests, *Bacillus uniflagelatus* (ATCC-15134), disclosed in U.S. Pat. No. 3,819,829 patented June 25, 1974, similarly employed in lieu of *Pseudomonas lindbergii* strongly inhibited, but did not prove lethal to *Helminthosporia*. The color of the fungi treated with antibiotic produced by *Bacillus uniflagellatus* did not change, and subcultures of the previously inhibited *Helminthosporia* grew with little difficulty to establish a new colony on a fresh culture media. This was not the case, of course, with the cultures killed with the antibiotic produced by *Pseudomonas lindbergii*.

The antibiotic produced by *Pseudomonas lindbergii* proved strongly inhibitory to *Sclerotium rolfsil*.

Notable fungi not markedly affected by the antibiotic produced by *Pseudomonas lindbergii* were *Aspergillus, Trichoderma* and *Rhizopus*.

Colonies of a saprophytic Mycobacterium in plates streaked with *Pseudomonas lindbergii* failed to show any growth and subcultures of such treated colonies showed no growth when transferred to fresh media. The subcultures of treated colonies showed signs of death; the medium in the immediate vicinity of the subculture became clouded as though a loss of cellular products had occurred. Medium supporting viable control subcultures showed no clouding.

Of the four groups of microorganisms which are known to produce disease in man, i.e., fungi, actinomycetes, yeast-like growths, and mycobacteria, all are attacked by *Pseudomonas lindbergii* and the growth of the organisms suppressed; or, the organisms are killed by *Pseudomonas lindbergii*, *Pseudomonas lindbergii* is effective against Strptococcus, Staphlococcus, *E. Coli*, Serratia, Klebseilla and Proteus.

EXAMPLE 11

An aqueous concentrate of the antibiotic from the culture medium, elaborated by the organism *Pseudomonas lindbergii*, as described by reference to the preceding examples was used to impregnate a segment of laboratory filter paper, and then air dried at low heat. The antibiotic remained stable and active as the aqueous phase was dried from the paper, and its activity was not reduced even after completion of the drying.

The antibiotic impregnated filter paper was used to treat athletes foot and fungus infected nails. Pieces of suitable size were placed between infected toes or under infected nails. In three separate cases the infections between the toes disappeared completely after treatment for 2 or 3 days. There was no sloughing of infected skin or tissue; what was white, infected tissue before treatment appeared completely normal, all painful cracks in the skin having healed rapidly. Treated toes remained healthy throughout an entire Louisiana summer. Twenty-four hours after placement of antibiotic treated paper under infected nails, much of the chronically infected tissue sloughed out leaving clean undernail cavities. Progress appeared slow after this remarkable, initial change because the normal or healthy nail was slow to grow out. With repeated treatment for a few weeks, completely healthy nails were restored.

The need for an antibiotic which can be used to effectively treat fungal diseases, especially human mycoses, is apparent, as is the need for one which can more rapidly effect remission of the symptoms of the infection.

EXAMPLE 12

As preliminary evidence related to the toxicity of the antibiotic, large quantities of Bermuda grass hay colonized by *Helminthosporium cynodontis* was treated with *Pseudomonas lindbergii*, allowed to incubate at about 25° C for about 10 days and then fed to a cow. The cow did not appear to have suffered any ill effects from the antibiotic.

Two types, slightly different in colony color, can be isolated from the type, stock culture of *Pseudomonas lindbergii*. One is whitish to cream color while the second is slightly yellowish. Both types, one designated white (W) and the other yellow (Y), produce antibiotic approximately equally well.

Cultures of *Pseudomonas lindbergii* can lose their activity for continued growth by entering into a kind of dormancy which is not always broken, or regenerated, by transferring the bacteria to fresh media. Such dormancy can occur in tightly capped tubes of potato, dextrose agar (PDA) and aged for approximately 6 months. Streaks of dormant bacteria failed to grow on fresh plates of potato, dextrose agar and several other media (nutrient agar, nutrient dextrose agar, and trypsinate soybean agar). Dormancy was broken when mycelial growth of the fungus, *Helminthosporium*, approached the dormant streaks. At this time the bacteria began to grow vigorously and continued to grow vigorously when transferred to fresh potato, dextrose agar minus any fungus growth. The following example is illustrative of the phenomenon of dormancy, regeneration of growth activity and maintenance of vigorous and active stock cultures of *Pseudomonas lindbergii*.

EXAMPLE 13

W and Y cultures of *Pseudomonas lindbergii*, taken from tightly capped tubes within which the bacteria had been maintained for about 6 months, were separately streaked on potato, dextrose agar plates. The first signs of growth of the white culture appeared in three days, about 48 hours later than was normal, and thereafter continued to grow well and produced antibiotic well. The second culture, also characterized as white in color on potato, dextrose agar but, unlike the first culture yellow on Trypsinate soybean agar, failed to grow at this time.

Three weeks later, the yellow culture of *Pseudomonas lindbergii* had not yet grown. An isolate of *Pseudomonas lindbergii* from a four month old broth, orange in color, was then streaked in the same plates where the yellow isolate had been streaked. These streaks very soon produced a heavy, vigorous orange growth (a relatively poor producer of antibiotic). In these same plates the yellow isolate soon thereafter began to grow and later tested out to be a good producer of antibiotic. Thus, dormancy of the yellow (Y) type of *Pseudomonas lindbergii* was broken by close growth association with a vigorously growing isolate of the bacterium.

The bacterium can also lose its ability to produce antibiotic in its own aged broth. Cultures retrieved from broth 6 months of age or longer tend to be orange in color, as opposed to the white to cream colored status of other types of *Pseudomonas lindbergii*. A good producing white isolate can be changed to a poor producing, orange isolate in aged broth. One isolate of *Pseudomonas lindbergii* obtained from a collaborator failed to grow when transferred to fresh potato, dextrose agar and, when dormancy was broken by close growth association with the fungus *Helminthosporium*, was orange in color when transferred and was a poor producer of antibiotic.

CHARACTERIZATION OF BACTERIUM

The bacterium which produced the antifungal material is a member of the genus *Pseudomonas* and, on the basis of the unique metabolic product, the antibiotic lethal to many fungi, the name proposed is *Pseudomonas lindbergii*.

*Pseudomonas lindbergii* is a gram negative rod, that measures $2.0$–$2.7 \times 0.6$–$0.8$ microns with approximately six polar flagella and does not floresce under ultraviolet light.

PRODUCTION OF ANTIBIOTIC

Satisfactory production of the antifungal antibiotic by *Pseudomonas lindbergii* occurred in potato, dextrose broth (200 gms. potato/liter and 15 gms. dextrose) stationary cultures at room temperature (25° C). Good levels of antibiotic activity were achieved after 4 to 5 days of growth, but higher levels occurred after 10 days. Ten day or slightly older cultures were centrifuged at 5000 r.p.m. to remove most of the bacterial sediment. One liter batches were washed with 500 ml of ethyl ether separated and the water phase concentrated in vacuo to 1/10 the original volume. The concentrates were extracted 4 times with an equal volume of chloroform each time, separated, and the chloroform evaporated. The precipitate was dissolved in 10 ml of distilled water and used for streaking of thin layer silica gel chromatograms. The antibiotic which was produced had a Rf of 0.8 with a solvent system essentially 70% chloroform and 30% ethanol.

The *Pseudomonas lindbergii* grew well on potato, dextrose agar, though various other nutrient mediums can be used to supply minerals and serve as a source of assimilable carbon and nitrogen. In fact, as heretofore stated, it was observed that growth of the bacterium was highly successful when streaked on plates containing a small colony of *Helminthosporium*. The bacteria benefitted from the association and when placed in the center of well established colonies of the fungus spread outwardly, gradually increasing in size to develop the entire colonies. The bacteria thus benefitted and thrived on the colonies of fungus. Transfer of the fungus yielded only the bacterium with no sign of growth of the fungus.

It is apparent that the process of this invention is subject to various modifications without departing the spirit and scope of the present invention.

Having described the invention, what is claimed is:

1. A process for the production of an antibiotic which comprises cultivating *Pseudomonas lindbergii* (ATCC-31099) in a nutrient medium, containing sources of assimilable carbon and nitrogen, at temperatures ranging from about 15° C to about 40° C until substantial antiotic activity is imparted to said medium.

2. The process of claim 1 wherein the antibiotic is isolated and recovered from the nutrient medium.

3. The process of claim 2 wherein the nutrient medium is clarified and the antibiotic isolated and recovered by solvent extraction.

4. The process of claim 1 wherein the temperature of the nutrient medium ranges between about 25° C to about 35° C.

5. The process of claim 1 wherein the nutrient medium is potato, dextrose agar.

6. The process of claim 1 wherein the nutrient medium is maintained under aerobic conditions.

7. The process of claim 1 wherein a portion of the liquid of the nutrient medium is separated to provide an antibiotic concentrate which is strongly inhibitory or lethal to various fungi.

8. The process of claim 1 wherein an antibiotic concentrate is separated from the nutrient medium by extraction with chloroform, and subsequent evaporation of chloroform.

9. The antibiotic produced by the process of claim 1.

* * * * *